US008104623B2

(12) United States Patent
Robertson

(10) Patent No.: US 8,104,623 B2
(45) Date of Patent: Jan. 31, 2012

(54) FILTERING SCREEN

(75) Inventor: Graham Robertson, Edinburgh (GB)

(73) Assignee: United Wire Limited (GB)

( * ) Notice: Subject to any disclaimer, the term of this patent is extended or adjusted under 35 U.S.C. 154(b) by 479 days.

(21) Appl. No.: 10/543,042

(22) PCT Filed: Apr. 7, 2004

(86) PCT No.: PCT/GB2004/001527

§ 371 (c)(1), (2), (4) Date: Jul. 21, 2005

(87) PCT Pub. No.: WO2004/089558

PCT Pub. Date: Oct. 21, 2004

(65) Prior Publication Data

US 2006/0081529 A1 Apr. 20, 2006

(30) Foreign Application Priority Data

Apr. 12, 2003 (GB) .................................. 0308475.3

(51) Int. Cl.
*B01D 33/03* (2006.01)

(52) U.S. Cl. ........ 210/489; 210/499; 209/319; 209/403; 175/66

(58) Field of Classification Search .................. 210/489, 210/499; 209/310, 403; 175/66
See application file for complete search history.

(56) References Cited

U.S. PATENT DOCUMENTS 2,211,081 A 8/1940 Sinclair
2,425,235 A * 8/1947 Ferrante .......................... 55/514
3,012,674 A 12/1961 Gerhard
3,094,302 A 6/1963 Stauffer
5,944,197 A * 8/1999 Baltzer et al. ................. 209/400
6,305,549 B1 10/2001 Riddle
2002/0023883 A1* 2/2002 Adams et al. ................. 210/780

FOREIGN PATENT DOCUMENTS

GB 2382037 A 5/2003

* cited by examiner

*Primary Examiner* — Terry Cecil
(74) *Attorney, Agent, or Firm* — Barnes & Thornburg LLP

(57) ABSTRACT

A screen is described for use in a vibrating machine for separating solids from liquid material, comprising woven wire cloth of orthogonal warp and weft wires, tensioned and bonded to a support structure defining at least one rectangular opening across which the cloth extends. The orientation of the cloth is chosen so that the warp wires extend across the width (i.e. shorter dimension) of the opening(s). If the cloth has a square mesh and the warp wires are of greater cross section than the weft wires, the warp wires will extend across the width of the frame, and if the cloth has a rectangular mesh, the greater number of warp wires per unit length will also extend across the width of the frame, so that in each case warp wires will resist in use the stresses across the width of the central region of the or each opening.

13 Claims, 4 Drawing Sheets

FILTERING SCREEN

FIELD OF THE INVENTION

This invention concerns screens such as are fitted to vibrating screening machines, sometimes used as shale shakers to separate solids from fluids. Such machines are of particular application in the oil well drilling industry to separate drilling mud from base fluid after recovery from down-hole during drilling.

BACKGROUND

Filter screens for use in such machines are typically constructed from woven wire cloth. When weaving wire cloth the warp wires are those that run along the length of the roll of wire-cloth as it is woven, and wound around the take-up drum, while the weft wires are those which run across the width of the wire-cloth.

Square mesh wire cloth is comprised of nominally identical numbers of warp and weft wires per unit area, and a common wire diameter. For example, a 200# market grade cloth has 200 warp wires per inch and 200 weft wires per inch. Both warp and weft wires are 0.050 mm in diameter.

Although there is still a desire to use wire cloth with generally square openings, and the use of generally square mesh as the filter media for oilfield screens is still widespread, rectangular meshes have proved to be successful as a robust, high capacity alternative to square mesh.

Robust filter media incorporating rectangular mesh are disclosed in U.S. Pat. No. 5,944,197 and PCT Application PCT/GB2002/005018.

A rectangular mesh is normally woven with more warp wires per unit length than weft wires per unit length, since the time taken to weave a given length of wirecloth is dependent on the number of weft wires.

One common type of screen comprises layers of mesh bonded to a support structure (normally referred to as a frame) which is usually generally flat and rectangular in shape, and which contains a number of similarly sized (normally rectangular) openings across which the screen mesh is tensioned. The mesh is supported by the frame and the openings in the frame define a corresponding number of mesh covered windows for filtering the fluid materials. The frame may be of metal but more preferably is of a plastics material particularly GRP and preferably is reinforced internally by a wire or rod framework. Such screens will be referred to as integral screens, that is the mesh and frame are integrated by the bonding of the mesh to the support frame. A jig for making integral screens in which two screens are made at the same time, is described in GB Patent Specification 2,382,037. Such a jig will be referred to as a jig of the type described.

In operation the maximum stress on the wire cloth in such a screen is found to occur at the middle of the longer dimension of the frame. This suggests that the wires running parallel to the shorter sides are subject to greater stress than those running parallel to the longer sides of the screen. Areas of maximum stress are indicated in FIG. 1, which is described more fully later.

It has also been observed in practice that the wires running parallel to the shorter span of the mesh in such a frame often tend to fail first, which also supports the theory that these wires are subject to greater stress.

Another common type of screen is a so-called hook-strip screen. Such a screen consists of generally rectangular sheets of wire cloth (mesh) with hooks along two parallel sides. The sheets are attached by the hooks to a stretching mechanism in the shaker. This stretches the mesh to tension the wire cloth. This is necessary to encourage good solids conveyance across the stretched mesh in use.

In practice hook-strip screens are usually stretched over a support which presents a convex upper surface to the mesh so that the mesh in tension becomes convexly curved as shown in FIG. 2. In general only two edges of the mesh include hooks, and the other two edges are not secured to the shaker. Therefore the tensioning load is applied in one direction only. This means that if the screen is over-tensioned the wires parallel to the tensioning direction will tend to fail before the wires extending in the perpendicular sense. In use, over-tensioning can occur due to excessive solids build-up or any general overloading of the screen, as well as due to any inappropriate tensioning of the mesh during set-up.

SUMMARY OF THE INVENTION

According to one aspect of the present invention an integral screen for use in a vibrating machine for separating solids from liquid material (especially solids from drilling mud recovered during oil well drilling), comprises woven wire cloth of orthogonal warp and weft wires, tensioned and bonded to a support structure defining a rectangular opening across which the cloth extends, wherein the orientation of the cloth is chosen so that the warp wires extend across the width (i.e. shorter dimension) of the rectangular opening and the weft wires extend across the length (i.e. longer dimension) of the rectangular opening.

Where the rectangular opening in the support structure includes a plurality of similarly dimensioned and orientated and regularly arranged smaller rectangular openings, formed by a lattice of struts criss-crossing the larger opening, the cloth is bonded to the lattice struts as well as the boundary of the larger opening, so that the warp wires are also parallel to the width (i.e. the shorter dimension) of the smaller rectangular openings.

In the case of a rectangular mesh cloth there will be more wires per unit length across the width of the rectangular opening than there are weft wires, to resist the greater stress found to occur across the width of the central region of the or each opening.

A cloth is thought of as having a rectangular mesh if the aspect ratio of the openings in the weave is at least 0.8:1.

In the case of a generally square mesh cloth the warp wires are preferably selected to have a greater cross sectional size than the weft wires, which if they extend perpendicularly relative to the length dimension of the or each opening are able to resist the greater stress across the width of the central region of the or each opening.

A cloth is said to have a square mesh if the openings in the weave have an aspect ratio of between 0.9:1 and 1:1.1.

Where the mesh is generally square, the larger warp wires preferably have a cross-sectional area of between 10% and 30% greater than the smaller weft wires.

More preferably the larger warp wires have a cross-sectional area in the range 20% to 25 % greater than the smaller weft wires.

Typically, the larger warp wires have a cross-sectional area 22% greater than that of the smaller weft wires.

The wires are typically of circular cross-section.

In one generally square mesh example, the diameter of the larger warp wires is 0.046 mm, and the diameter of the weft wires is 0.036 mm, and there may be 200 warp wires per inch and 230 smaller weft wires per inch.

In another generally square mesh example, the diameter of the wires is as before, but there are 212 larger warp wires per inch and 230 smaller weft wires per inch.

If rectangular mesh cloth is employed in the manufacture of a rectangular integrated screen, it is generally believed that in order to achieve optimum solids conveyance and de-blinding the rectangular openings in the weave should be aligned with their longer dimension parallel to the direction of solids flow over the screen. Where the support frame has a plurality of regularly arranged similarly orientated and similarly sized smaller rectangular openings, the longer dimensions of which are parallel to the length dimension of the frame, the solids flow will normally be parallel to the length dimension of the frame, and accordingly it has been considered necessary for the warp wires in the rectangular mesh cloth stretched over the rectangular openings, to run the length of the rectangular openings, to achieve optimum solids conveyance and deblinding.

A common overall frame size is of the order of 42"×30" and if 48" wide cloth is to be used so that the weft wires extend across the 30" dimension, the cloth has to be orientated relative to the frame so that the 48" width extends across the 30" width of the frame. Accordingly there will be a lot of waste cloth to be cut away from the two longer edges of the frame after bonding.

Trials have been undertaken to determine if this orientation of rectangular mesh cloth does in fact make a noticeable difference to the performance of the screen, as compared to the orthogonal orientation, in which the longer dimension of the rectangular openings in the weave is perpendicular to the direction of flow. In this orthogonal orientation the longer dimensions of the openings in the weave will be perpendicular to the length dimension of the rectangular frame and that of each of the rectangular windows in the frame, and the warp wires will now extend across the width of the frame and across the width of each of the smaller windows. No noticeable difference was found.

According therefore to another aspect of the invention in a method of manufacturing two integral screens side by side in a jig of the type described wherein a length of woven wire cloth is laid across two rectangular frames laid side by side in the jig with longer edges thereof abutting, the cloth is orientated so that the warp wires extend continuously across the two side by side screens and the weft wires extend parallel to the longer edges of the frames, and the cloth is bonded to the frames before being severed along the join and surplus wire cloth is trimmed away from around the edges of the frame.

Thus in accordance with the method proposed by the invention in which standard 48" wide woven wire cloth is to be employed, the 48" wide cloth is cut to 66" length, and laid over the two side by side frames in the jig, with the warp wires perpendicular to the length dimension of the frames and where the frames include smaller rectangular openings, the warp wires are therefore perpendicular to the longer dimension of each of the smaller openings in the frames.

This not only allows less costly cloth to be used but also improves the screen life since if the cloth has a square mesh and the warp wires have a greater cross section size than the weft wires, the stronger warp wires will extend across the width of the support frame (and the width of each window in the frame), and if the cloth has a rectangular mesh, the greater number of warp wires per unit length will also extend across the width of each support frame (and the width of each window in the frame), and therefore in each case the greater wire cross section or greater number of wires per unit length, will resist the stresses found to occur across the width of the central region of the or each opening.

As a further advantage, by using 48" wide cloth, cut to 66" lengths from the 48" roll, there is much less waste cloth to be trimmed off the edges of the frames after the cloth has been bonded to the frames, as compared with the use of 48" wide cloth applied to one frame at a time, so as to produce the mesh orientation previously believed to be desirable for rectangular mesh cloth.

Making screens in accordance with the invention contrary to the previously long held belief that the warp wires of rectangular mesh cloth should run parallel to the direction of solids flow over the screen, allows screens to be made with no apparent loss of performance, using low cost standard 48" width cloth and with minimal waste cloth.

The invention thus has the advantage of enabling fully functional and long-life screens to be made using standard 48" wide woven wire cloth.

According to another aspect of the present invention a hook-strip screen for use in a vibrating machine for separating solids from liquid material (especially solids from drilling mud recovered during oil well drilling) comprises a sheet of woven wire cloth having a plurality of hooks along two opposite parallel edges of the sheet of wire cloth for attaching the two ends of the sheet to the machine, which edges are parallel to the weft wires of the weave, so that the warp wires extend between the edges containing the rows of hooks.

In the case of a rectangular mesh cloth in which there are more warp wires than weft wires per unit length, the greater number of warp wires will be available to resist any over-tensioning.

Likewise, if the cloth has a square mesh, the hooks will be positioned along the two parallel edges of the cloth between which the greater cross-section warp wires extend, which again are available to resist over-tensioning.

In each case the hooks of the hook-strip screen are used to retain the sheet of wire cloth in a shaker machine in manner know per se.

Some examples of woven wire cloth are given below.

A standard 230 mesh screen cloth has the following features:

Standard 230#

| | | |
|---|---|---|
| warp count | 230 | per inch |
| warp diameter | 0.036 | mm |
| weft count | 230 | per inch |
| weft diameter | 0.036 | mm |

Nominal Aperture size—0.074×0.074 mm

A screen has been manufactured in accordance with the invention, which has larger warp wires than weft wires.

The modified cloth has the following features:

Modified 230#

| | | |
|---|---|---|
| warp count | 200 | per inch |
| warp diameter | 0.046 | mm |
| weft count | 230 | per inch |
| weft diameter | 0.036 | mm |

Nominal Aperture size—0.081×0.074 mm

The wires of the modified 230# mesh cloths provide a slightly elongated wire aperture (having a 1:1.1 aspect ratio). This does not compromise the cut point significantly. The overall nominal cut point would be 76.3 rather than 74 (by the equivalent spheres method).

The conductance of the modified mesh is probably decreased from 1.17 kD/mm to 1.07 kD/mm. However this is offset by the fact that the warp wires have 22% greater cross-sectional area, which significantly prolongs the life of the screen.

An alternative modified 230# mesh cloth has the following attributes:

| | | |
|---|---|---|
| warp count | 212 | per inch |
| warp diameter | 0.046 | mm |
| weft count | 230 | per inch |
| weft diameter | 0.036 | mm |

Nominal Aperture size—0.074×0.074 mm

Thus the wire apertures are square.

Figure 1:
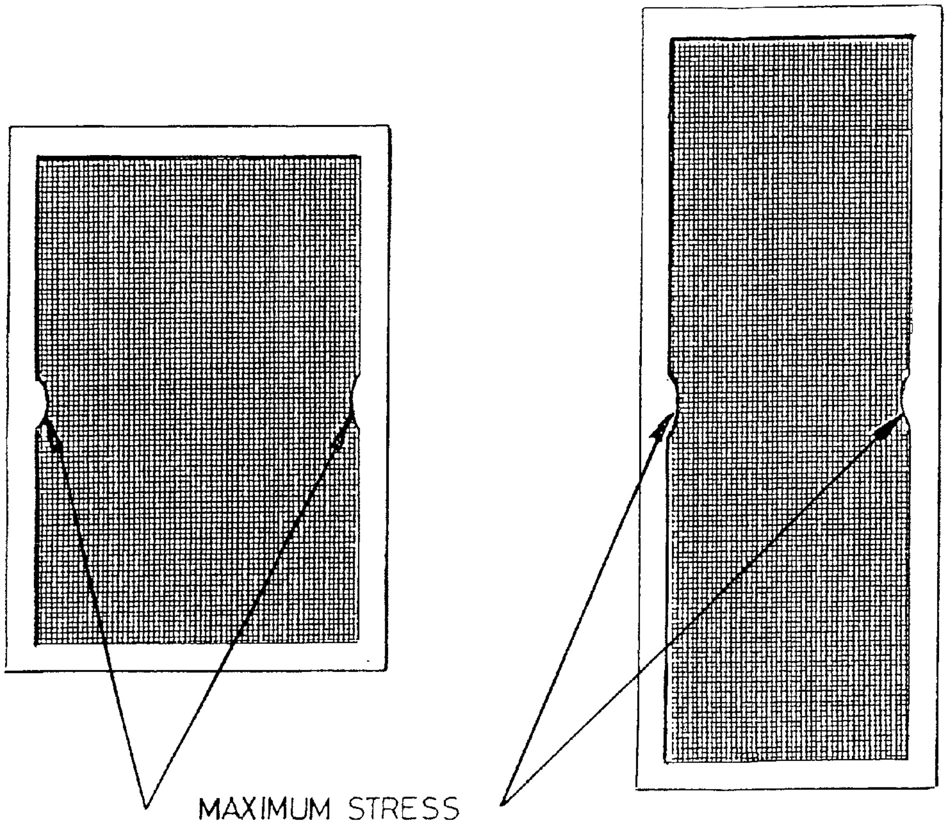
FIG. 1 is a plan view of a wire mesh filter screen.
Figure 2:
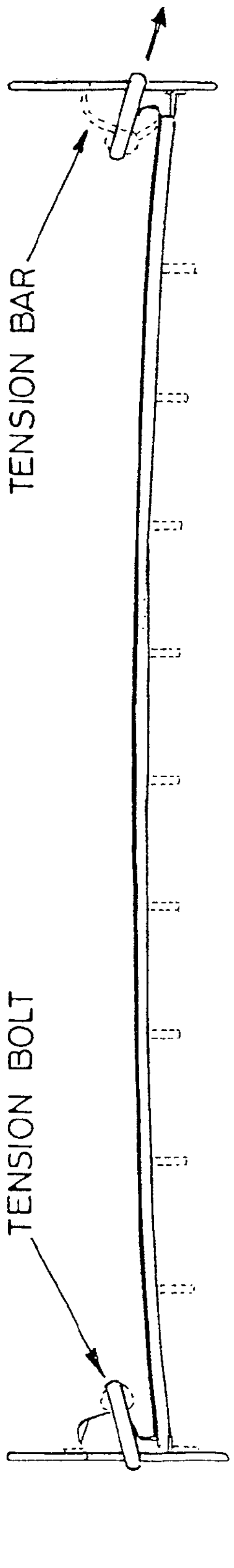
FIG. 2 is a plan view of a hook-strip screen, stretched over a radius.
Figure 3:
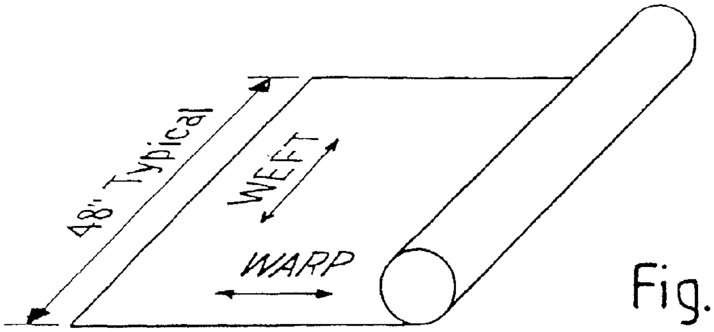
FIG. 3 is a perspective view of a wire cloth roll, partly unrolled.

Up to 85% of looms that are used for weaving wire-cloth in the world today weave cloth which is up to a maximum of 48 inches in width (i.e. in the weft direction). This is illustrated in FIG. 3. Therefore 48 inch wide wire-cloth is widely available and is relatively cheap because of this. The other 15% of looms are designed to weave a variety of greater widths, such as up to 60 inches, 66 inches and 72 inches. These greater widths however are as a consequence much scarcer than standard 48 inch wide cloth, and can be up to four times as expensive per square metre.

Figure 4:
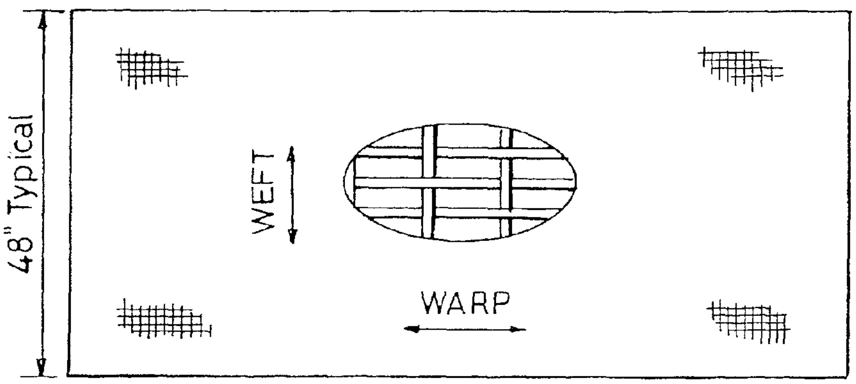
FIG. 4 is a plan view of a rectangular panel cut from the roll with the warp and weft wires shown to an enlarged scale in a scrap view.

As described above, a wire cloth having a generally square weave (or mesh), contains substantially as many weft wires per unit length as there are warp wires per unit length. Where the cloth is to have a rectangular mesh case there are usually more warp wires per unit length than weft per unit length, because the time to weave a roll of wire-cloth is dependant upon the number of weft wires. A 48" wide rectangular mesh wire cloth is illustrated in FIG. 4.

Figure 5:
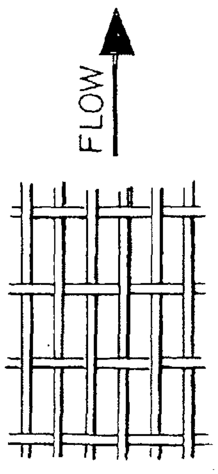
Fig. 5 PRIOR ART
FIG. 5 illustrates the orientation of rectangular mesh openings relative to the direction of solids flow over the screen, which hitherto has been held to be the preferred orientation for the openings in the weave of such cloth.
Figure 6:
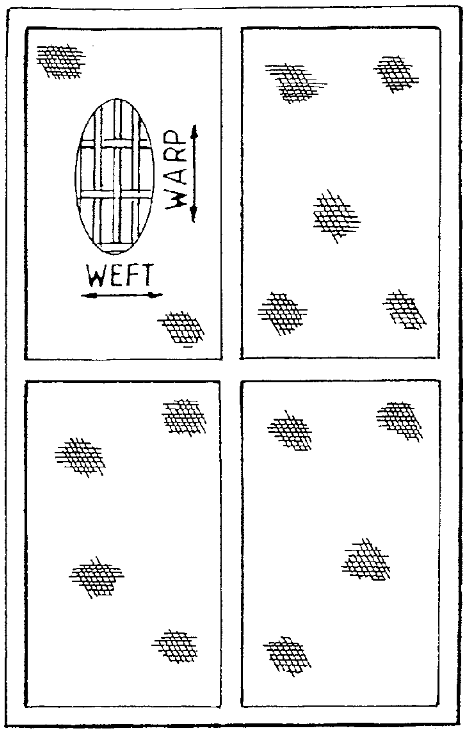
Fig. 6 PRIOR ART
FIG. 6 is a plan view of an integral rectangular screen showing how rectangular mesh cloth has (historically) been orientated relative to the support frame.

If rectangular mesh cloth is employed in the manufacture of a rectangular integrated screen, it is generally believed that in order to achieve optimum solids conveyance and de-blinding the rectangles in the mesh should be aligned with their longer dimension parallel to the direction of solids flow over the screen, as shown in FIG. 5. Where the frame has a plurality of regularly arranged similar sized smaller rectangular openings, the longer dimensions of which are parallel to the length dimension of the frame, the solids flow will normally be parallel to the length dimension of the frame, and this means that for a rectangular mesh cloth stretched over rectangular openings the warp wires should run the length of the rectangular openings, as shown in FIG. 6.

A common screen size is of the order of 42"×30" and if 48" wide cloth is to be used so that the warp wires extend across the 30" dimension the cloth has to be orientated relative to the frame so that the 48" width extends across the 30" width of the frame, and there will be a lot of waste cloth to be cut away from the two longer edges of the frame after bonding.

Figure 7:
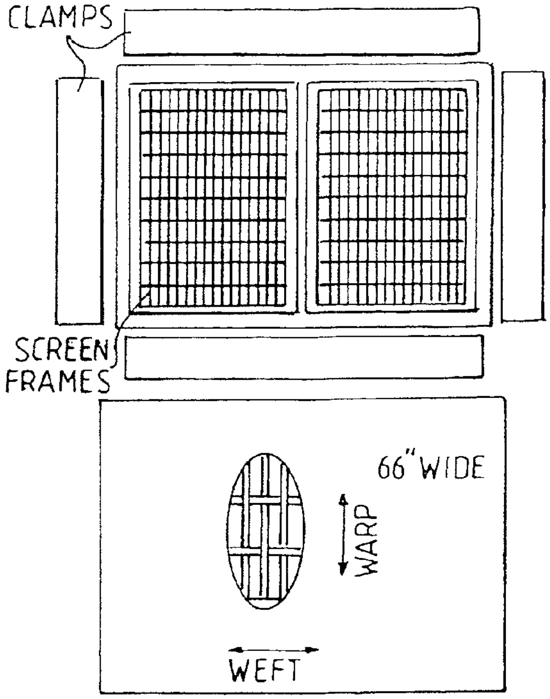
FIG. 7 shows how two frames such as shown in FIG. 6 can be covered using a single 66" wide cloth using a preferred method of manufacture.

In fact, such screens are preferably manufactured using a jig as described in GB Patent 2,382,037. This jig essentially requires a single sheet of wire cloth 66" by 48" to be laid over two frames, arranged side by side in the jig as illustrated in FIG. 7.

However if warp wires are to traverse the 30" dimension of the two frames, 66" wide woven wire-cloth will be required if a single sheet of wire-cloth is to be stretched over and bonded to the two side by side frames, a relatively small amount of surplus cloth has to be trimmed from the edges of the frame to complete the process, in the manner described in GB 2,382,037. However 66" wide wire cloth is expensive.

Trials have been undertaken to determine if this orientation of rectangular mesh cloth (see FIGS. 6 and 7) does in fact make a noticeable difference to the performance of the screen, as compared to the orthogonal orientation, in which the longer dimension of the openings in the rectangular mesh is perpendicular to the direction of flow and therefore perpendicular to the length dimension of a rectangular frame having rectangular windows such as in FIG. 6. No noticeable difference was found.

Figure 8:
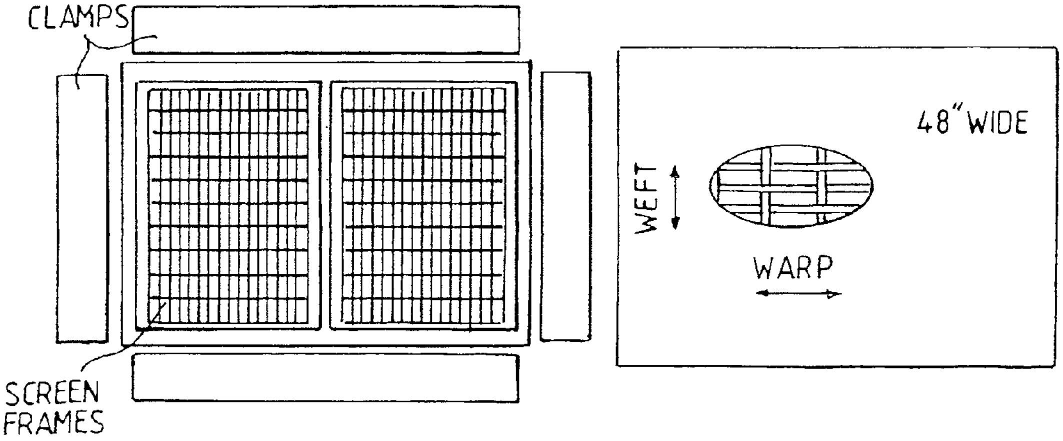
FIG. 8 shows how a length of 48" wide rectangular mesh wire cloth can be used in the preferred manufacturing process in which two screens are made at the same time in a single jig.

FIG. 8 illustrates the method of making a screen as proposed by the present invention which allows 48" wide woven wire cloth to be employed. Here the 48" wide cloth is cut to 66" length, and laid over the two side by side frames in the jig, with the warp wires perpendicular to the length dimension of the frames and therefore perpendicular to the longer dimension of each of the smaller rectangular openings in the frames.

This not only allows the less costly cloth to be used but also improves the screen life since if the cloth has a square mesh, and the warp wires have a greater cross section size than the weft wires, the stronger warp wires will extend across the width of the support frame, and if the cloth has a rectangular mesh, the greater number of warp wires per unit length will also extend across the width of the support frame and therefore in each case the greater wire cross section or greater number of wires per unit length, will resist the stresses found to occur across the width of the screen.

As a further advantage, by using 48" wide cloth, cut to 66" lengths from the 48" roll, there is much less waste cloth to be trimmed off the edges of the frames after the cloth has been bonded to the frames, as compared with the use of 48" wide cloth applied to one frame at a time, so as to produce the mesh orientation previously believed to be desirable for rectangular mesh cloth.

Making screens in accordance with the invention contrary to the previously long held belief that the warp wires of rectangular mesh cloth should run parallel to the direction of solids flow over the screen, allows screens to be made with no apparent loss of performance, using low cost standard 48" width cloth and with minimal waste cloth.

The invention thus has the advantage of enabling fully functional and long-life screens to be made using standard 48" wide woven wire cloth.

The invention claimed is:

1. An integral screen for use in a vibrating machine for separating solids from liquid material, comprising a support structure comprising a rectangular support frame defining a first rectangular opening having a width shorter in dimension than a length, and woven wire cloth of orthogonal warp and weft wires, the first rectangular opening in the support structure including a plurality of similarly dimensioned, similarly orientated and regularly arranged smaller rectangular openings or windows, formed by a lattice of struts criss-crossing the first opening, wherein the cloth is bonded to the support structure, being bonded to the lattice struts as well as the boundary of the first opening, with the cloth extending in a tensioned state across the first opening, the cloth has rectangular openings in the weave, having a greater number of warp wires per unit length than there are weft wires per unit length, and the orientation of the cloth is such that the warp wires extend across the width (i.e. shorter dimension) of the first rectangular opening and the weft wires extend across the length (i.e. longer dimension) of the first rectangular opening, with the warp wires also being parallel to the width dimension (i.e. the shorter sides) of the smaller rectangular openings.

2. A screen as claimed in claim 1 wherein the warp wires have a cross-sectional area of between 10% and 30% greater than the weft wires.

3. A screen as claimed in claim 2 wherein the warp wires have a cross-sectional area in the range 20% to 25% greater than the weft wires.

4. A screen as claimed in claim 3 wherein the warp wires have a cross-sectional area 22% greater than that of the weft wires.

5. A screen as claimed in claim 1 wherein the wires are of circular cross-section.

6. A screen as claimed in claim 5 wherein the diameter of the larger warp wires is 0.046 mm, and the diameter of the weft wires is 0.036 mm.

7. An integral screen for use in a vibrating machine for separating solids from liquid material, comprising a support structure comprising a rectangular support frame defining a first rectangular opening having a width shorter in dimension than a length, and woven wire cloth of orthogonal warp and weft wires, the first rectangular opening in the support structure including a plurality of similarly dimensioned, similarly orientated and regularly arranged smaller rectangular openings or windows, formed by a lattice of struts criss-crossing the first opening, wherein the cloth is bonded to the support structure, being bonded to the lattice struts as well as the boundary of the first opening, with the cloth extending in a tensioned state across the first opening, the cloth has generally square openings in the weave, the warp wires all have a greater cross-sectional area than all the weft wires, and the orientation of the cloth is such that the warp wires extend across the width (i.e. shorter dimension) of the first rectangular opening and the weft wires extend across the length (i.e. longer dimension) of the first rectangular opening, with the warp wires also being parallel to the width dimension (i.e. the shorter sides) of the smaller rectangular openings.

8. A screen as claimed in claim 7 wherein the warp wires have a cross-sectional area of between 10% and 30% greater than the weft wires.

9. A screen as claimed in claim 8 wherein the warp wires have a cross-sectional area in the range 20% to 25% greater than the weft wires.

10. A screen as claimed in claim 9 wherein the warp wires have a cross-sectional area 22% greater than that of the weft wires.

11. A screen as claimed in claim 7 wherein the wires are of circular cross-section.

12. A screen as claimed in claim 11 wherein the diameter of the larger warp wires is 0.046 mm, and the diameter of the weft wires is 0.036 mm.

13. A vibrating machine for separating solids from liquid material, the machine including an integral screen over which solids flow in a specified direction, the screen comprising a support structure comprising a rectangular support frame defining a first rectangular opening having a width shorter in dimension than a length, and woven wire cloth of orthogonal warp and weft wires, the first rectangular opening in the support structure including a plurality of similarly dimensioned, similarly orientated and regularly arranged smaller rectangular openings or windows, formed by a lattice of struts criss-crossing the first opening, wherein the cloth is bonded to the support structure, being bonded to the lattice struts as well as the boundary of the first opening, with the cloth extending in a tensioned state across the first opening, the cloth has rectangular openings in the weave, having a greater number of warp wires per unit length than there are weft wires per unit length, and the orientation of the cloth is such that the warp wires extend across the width (i.e. shorter dimension) of the first rectangular opening and the weft wires extend across the length (i.e. longer dimension) of the first rectangular opening, wherein the weft wires of the cloth are aligned with said specified direction of solids flow over the screen, with the warp wires also being parallel to the width dimension (i.e. the shorter sides) of the smaller rectangular openings.

* * * * *